United States Patent
Miller

(12) 
(10) Patent No.: US 6,297,878 B1
(45) Date of Patent: *Oct. 2, 2001

(54) NON-SCANNING, THREE-AXIS, SELF-REFERENCED HETERODYNE LASER AIR DATA SENSING SYSTEM

(75) Inventor: Mark S. Miller, Apple Valley, MN (US)

(73) Assignee: Rosemount Aerospace Inc., Burnsville, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,051

(22) Filed: Nov. 13, 1998

(51) Int. Cl.$^7$ .............................. G01P 3/36; G01B 11/26
(52) U.S. Cl. ........................ 356/28.5; 356/141.1
(58) Field of Search ........................... 356/28.5

(56) References Cited

U.S. PATENT DOCUMENTS

| | | | |
|---|---|---|---|
| 3,968,362 | 7/1976 | Mocker | 250/216 |
| 4,125,778 | 11/1978 | Smart | 250/574 |
| 4,127,329 | 11/1978 | Chang et al. | 356/301 |
| 4,136,954 | 1/1979 | Jamieson | 356/349 |
| 4,242,194 | 12/1980 | Steiner et al. | 204/299 |
| 4,648,714 | 3/1987 | Benner et al. | 356/301 |
| 4,721,385 | 1/1988 | Jelalian et al. | 356/5 |
| 4,812,035 | 3/1989 | Freedman et al. | 356/5 |
| 4,919,563 | 4/1990 | Komine | 356/28.5 |
| 4,940,330 | 7/1990 | Dopheide et al. | 356/28.5 |
| 4,953,976 | 9/1990 | Adler-Golden et al. | 356/301 |
| 5,048,951 | * 9/1991 | Combe et al. | 356/28.5 |
| 5,070,483 | * 12/1991 | Berni . | |
| 5,112,127 | 5/1992 | Carrabba et al. | 356/301 |
| 5,164,784 | 11/1992 | Waggoner | 356/28.5 |
| 5,170,218 | 12/1992 | Keene | 356/28.5 |
| 5,253,033 | 10/1993 | Lipchak et al. | 356/5 |
| 5,294,806 | 3/1994 | Batchelder et al. | 250/574 |
| 5,394,238 | 2/1995 | Mocker et al. | 356/342 |
| 5,414,509 | 5/1995 | Veligdan | 356/349 |
| 5,859,694 | 1/1999 | Galtier et al. | 356/28.5 |

* cited by examiner

*Primary Examiner*—Stephen C. Buczinski
(74) *Attorney, Agent, or Firm*—Westman, Champlin & Kelly, P.A.

(57) ABSTRACT

A three-axis, non-scanning, self-referenced laser air data sensing system comprises a support having three separate laser diodes providing beams of coherent light, which beams are directed toward separate beam expander mirrors. The expander mirrors reflect an expanding beam back toward a focusing mirror that focuses the beams along three diverging axes at known angles to each other at three separate locations in space. The focused beams form small detection cell regions through which particles in the fluid pass and reflect light. The reflected light is received back along the same paths as the transmission of the source light, and is directed back toward detectors on the base. The reflected light undergoes a Doppler shift, and this reflected light is combined with a reference signal tapped from one of the other of the three coherent light sources for heterodyning the signals for determining the Doppler shift and thus the relative velocity.

20 Claims, 5 Drawing Sheets

NON-SCANNING, THREE-AXIS, SELF-REFERENCED HETERODYNE LASER AIR DATA SENSING SYSTEM

BACKGROUND OF THE INVENTION

The present invention relates to a non-scanning three-axis laser air data sensing system, including heterodyne operation for obtaining complete velocity information (i.e. direction and relative speed) with reference to particles or surfaces reflecting the provided laser beams.

At the present time, light detection and ranging (LIDAR) techniques for determining relative velocities between a laser source and airborne particulates that reflect light from the laser are known. To obtain information for more than one axis of velocity, these systems require either a scanning device for scanning the laser beam source to positions for sensing in different axes, or multiple sources and telescopes to provide the multiple axes. Scanners will increase the complexity of the circuitry used as well as the complexity of the packaging. Also, there are reliability issues for the moving parts involved. For multiple lasers and telescopes, the cost is increased drastically over a single telescope/laser system.

The technique to measure velocity involves Doppler principles where a frequency shift in the reflected signal is used for determining the relative fluid velocity. U.S. Pat. No. 5,164,784 illustrates schematically a device that uses a continuous wave Doppler Lidar with an enhanced signal to noise ratio, but this operates only in a single axis. The readout circuitry disclosed in U.S. Pat. No. 5,164,784, for analyzing the return signal of reflected light from a particle in order to determine the relative velocity of the particle, can be used with return signals obtained with the present invention to providing the output information. The present invention utilizes three separate laser sources to provide three axis information while eliminating the need for scanning. "Non-scanning", as used herein, means the laser beams have a pre-defined and non-moving path.

SUMMARY OF THE INVENTION

The present invention relates to a three-axis laser air data sensing system that permits accurate determination of relative velocity between laser sources and particles or other surfaces that reflect the laser beams from the sources, without the need for scanning, and without providing an additional frequency source for heterodyning the reflected signals.

The invention comprises a plurality of separate sources, as shown, three, that have beams which are focused to a small diameter and volume, and therefore higher power density to get a higher percent of reflectivity off particles passing through the volume at the focal region. The reflected light exhibits a Doppler shift in frequency, and is reflected back along the same path as the source light is emitted. The reflected beam is used in connection with a sensing system to obtain a signal that indicates relative velocity between the laser source and the reflecting particle. The beams are directed along separate axes so velocity in the orthogonal axes can be resolved.

The present invention has a focusing arrangement to focus the laser beams to a small focal volume, so that the volume at the focal region will on average contain only one particle at any one time. A single particle in the tightly focused focal region provides for a stronger reflection than in larger volumes even when multiple particles are present. However, if desired, this invention can be used with larger volume, pulsed LIDAR systems. Appropriate changes to the source and design of the focusing optics will allow these changes. In fact, a range gaged collimated system could also be designed using the principals presented in this invention.

When the coherent light is reflected from an aerosol particle and received back at the instrumentation, it is intercepted by an optical switch which will turn the reflected beam, while the source beam passes through unimpeded in the opposite direction.

In order to heterodyne the reflected beams, a reference is provided from a different one of the source beams and the reference is combined with the return signal from an adjacent source. About only 1% of the respective source signal is tapped for the reference signal for the heterodyne operation, and since there are three laser sources, typically, source one would provide the reference for return signal two, source two would provide the reference for return signal three and source three would provide the reference for return signal one.

The frequencies of the plurality of laser sources are separated from each other by an amount greater than the frequency shift caused by the Doppler effect of the reflected beam, so that heterodyne detection is possible with unambiguous velocity direction and magnitude determination at each signal, path.

Standard optical components are used for obtaining these results, when they are arranged in the appropriate way. The frequencies of the laser sources can be adjusted to accommodate known ranges of relative velocity. If the relative velocity is high, the source frequency separation is set higher. In the preferred embodiment, laser diodes are used, so that consumed power can be relatively low. The present focusing arrangement, which provides reflection from a single particle passing through the beam focal region, also provides a return signal that is much stronger than with larger focal regions where reflections from multiple particles can be present at once. Again, the focal region is selected so that the volume of the light at the focal region will contain only one particle.

In the present system, the non-scanning, three-dimensional laser system has a support that preferably mounts three laser diodes, as shown spaced 120° around a central axis, and which direct the collimated, coherent light onto separate expander mirrors that are spaced from the laser sources a selected amount. The expander mirrors expand the individual beams and reflect the respective beams back toward a concave focusing mirror, which will receive all of the expanded beams and cause the beams to be reflected in separate directions away from the laser sources, to refocus the separate beams at a specified distance from the focusing mirror.

The expander mirrors can be specially designed, to remove any spatial aberrations introduced by the offset alignment in the form shown.

The beams will be reflected by the concave focusing mirror past the supports for the expander mirrors and into space. As an aerosol particle passes through the focal region of the respective beams, light is reflected back along the same path as the outgoing light for that beam, to the concave focusing mirror, back to the respective expander mirror, and back to the instrumentation where the reflected light is passed into a detection system. As shown, the detection system includes an optical combiner to combine a reference signal and the reflected signal for heterodyning, and passing this heterodyned signal to a detector circuit of conventional design.

The detector circuit provides an electrical output containing information on the Doppler shift of the reflected signal, which is used to compute a velocity in a known processing circuit. The three velocities from the three axes are geometrically combined to provide velocities in the three orthogonal axes.

With the present laser diodes used, the overall size of the instrumentation unit can be kept relatively small. For example, with a 2 mm diameter source beam, the expander mirrors can be 2 cm in diameter and the focusing mirror may be in the range of 8 to 10 cm. Also, laser diodes do not consume large amounts of power, so cooling is not needed, and the laser diodes provide a tightly focused beam. Solid state, gas or other lasers can be used if desired.

While a three-axis system is shown, a two-axis system also can be used, with the principle of using a, portion of the signal from one of the sources for a, reference signal for heterodyning the reflected signal from the other source.

It also is helpful to keep the laser sources equally spaced around a central axis for simplifying the calculations for orthogonal velocities, but different geometric configurations can be made if Cartesian coordinates are used to provide the positions of the beams and are calculated and used in connection with analyzing the detected signals.

The system that is shown in the present specification and the drawings is a schematic representation of the types of supports that can be used, and other supports also can be used for supporting the components, such as the focusing mirror and the expander mirrors.

DETAILED DESCRIPTION OF THE PREFERRED EMBODIMENTS

Figure 1:
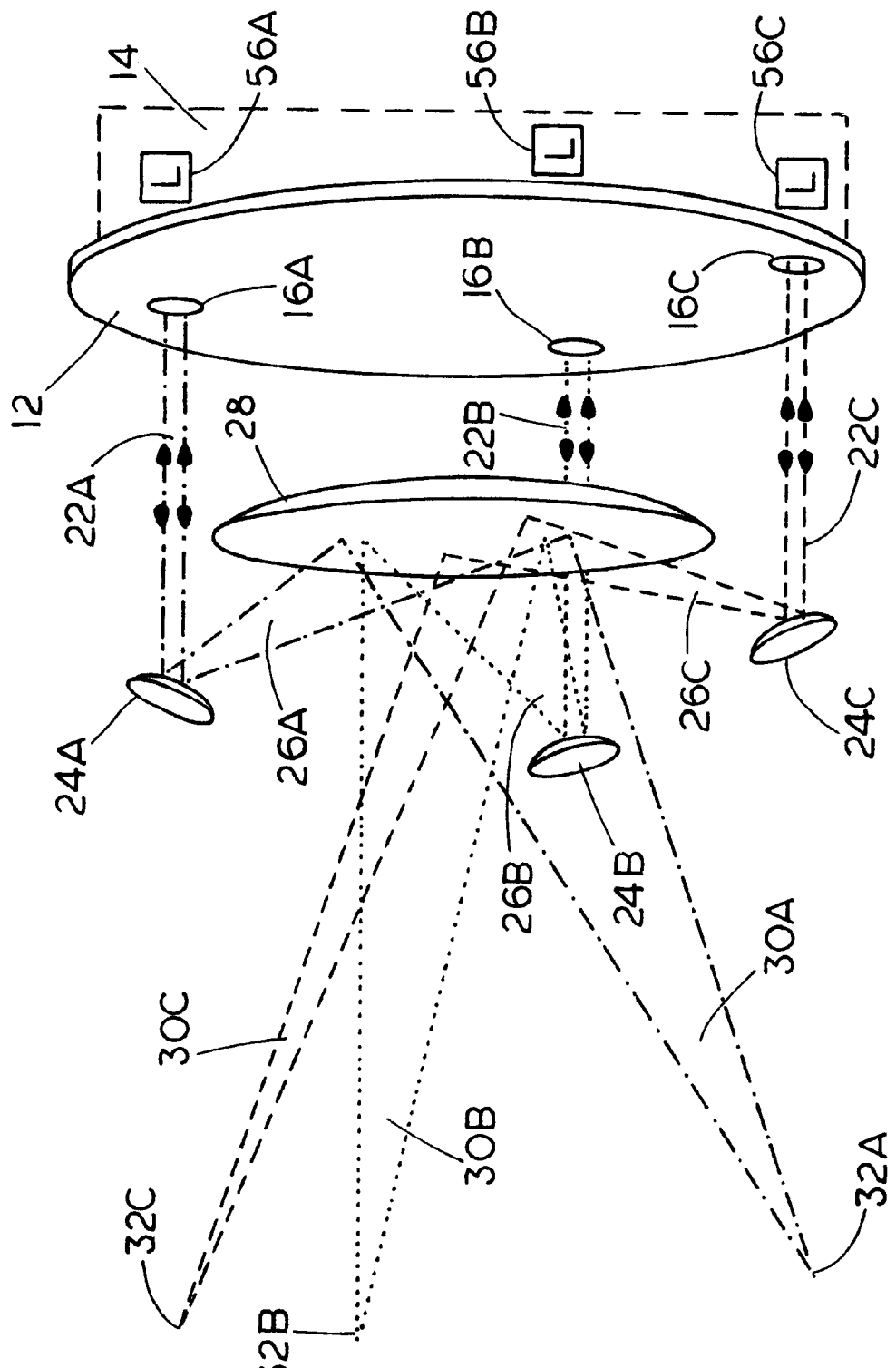
FIG. 1 is a schematic perspective view of a non-scanning, three-axis laser air data sensing system made according to the present invention.
Figure 7:
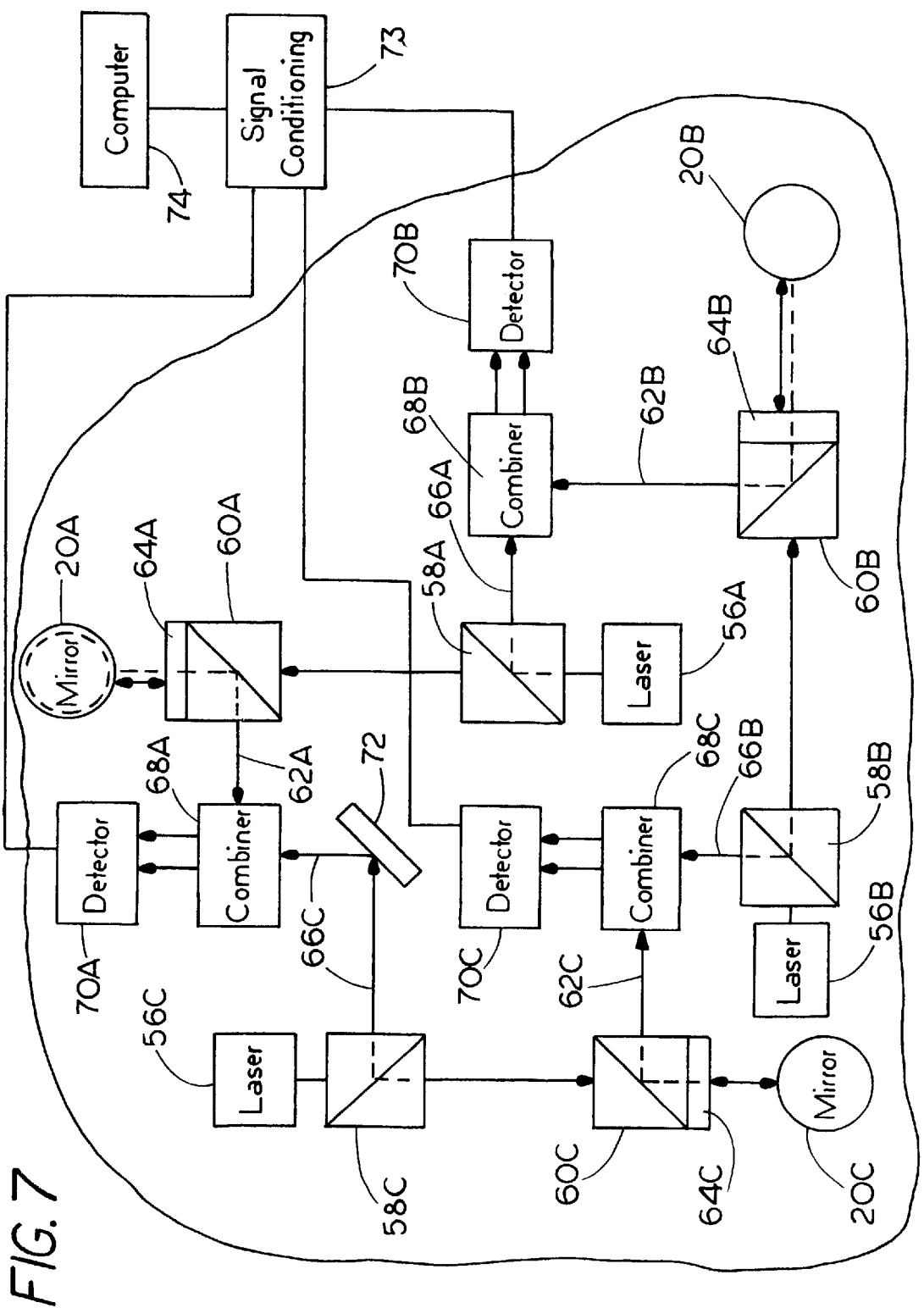
FIG. 7 is a schematic representation of the non-scanning optical arrangement used for providing source beams and detecting the reflected light signals.

Referring first to FIG. 1, the three-axis, non-scanning air data sensing system is indicated generally at 10 and includes a support 12, which can be an optics bench, or for example, a base for a frame for mounting on an aircraft for sensing air data from the atmosphere surrounding the aircraft. The base 12 forms mounting for the source lasers and other sensing components in an instrumentation package that is indicated generally at 14. The base or support 12 either is an open framework or has ports 16A, 16B and 16C for beams of coherent light from laser sources 56A–56C, as illustrated in FIG. 7. The laser beams, as indicated in FIG. 1, include a first laser beam 22A, a second laser beam 22B, and a third laser beam 22C, which are represented as dotted and dashed lines showing the path of the source beams and the reflected return signals respectively.

The source laser beams are directed to individual expander (convex) part spherical mirrors 24A, 24B and 24C, which are used for expanding and reflecting the source beams 22A–22C, respectively. The expanding beams are shown at 26A, 26B and 26C after being reflected, and are directed toward a focusing concave spherical surface mirror 28 that is mounted in a suitable manner, within the area encompassed by the source beams 22A–22C. The concave spherical mirror is mounted, and is of a size, so it does not interfere with transmission of the source beams. The mirror 28 is actually only a portion of a complete sphere, but the reflecting surface is a spherical surface.

Figure 6:
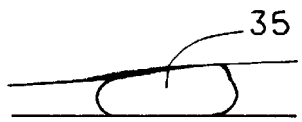
FIG. 6 is a schematic representation of a focused beam in a focal area of a beam indicating a particle passing through the beam for reflecting light.

Three separate expanding (diverging) beams are reflected from the expander mirrors to the focusing mirror 28. The expanded beams are then reflected and converge to three different focusing regions. The converging reflected beam originally from mirror 24A is illustrated at 30A; the converging reflected beam originally from mirror 24B is indicated at 30B; and the converging beam originally from mirror 24C is indicated at 30C. This brings about separate focal regions, which are represented at 32A, 32B, and 32C. These focal points or regions are typically quite small in diameter and the length of the focused region in space (the depth of field) is also short. In the preferred embodiment, the volume of the focal region of the reflected beams is selected to be small enough so that only one of the average size particles expected to be encountered will be in the focal region at any time. This focal volume is typically smaller than that statistically expected to contain one particle in the fluid whose relative velocity is to be determined. The reflection from a single particle in a small focal volume provides a stronger reflected signal than when there is a larger focal volume where more than one particle is reflecting the focused beam. FIG. 6 shows this region at 35. The diameter is about 10 of the length of the focal region 35. The length can be in the range of 1 mm. This region 35 forms a particle detection cell.

The reflected beams 30A–30C are each centered along axes which are at a known angle relative to a reference plane or relative to each other in reference planes. Vectors in three mutually perpendicular orthogonal axes can be derived with readout circuitry.

Figure 2:
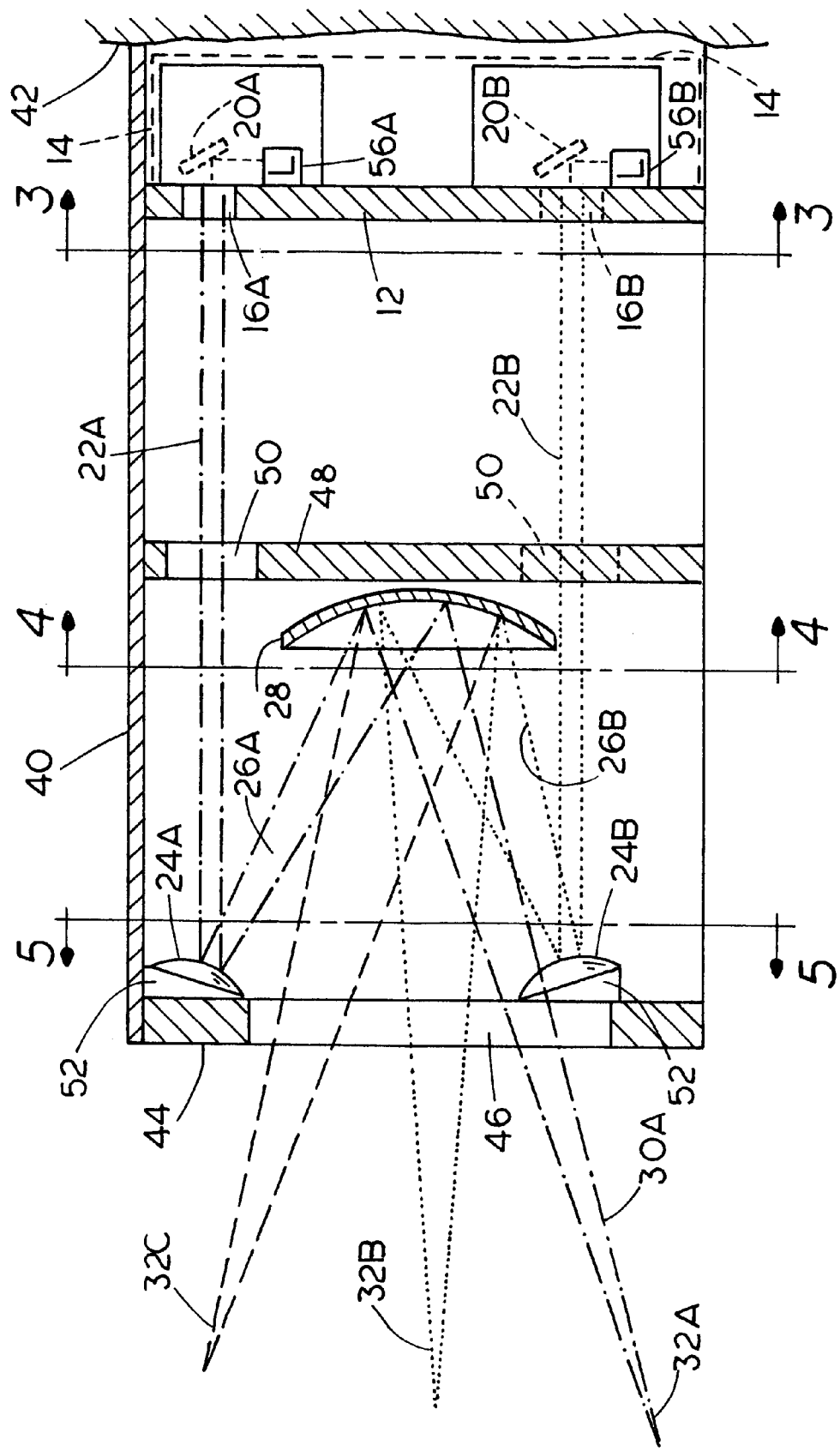
FIG. 2 is a schematic side sectional view of the device of FIG. 1.
Figure 3:
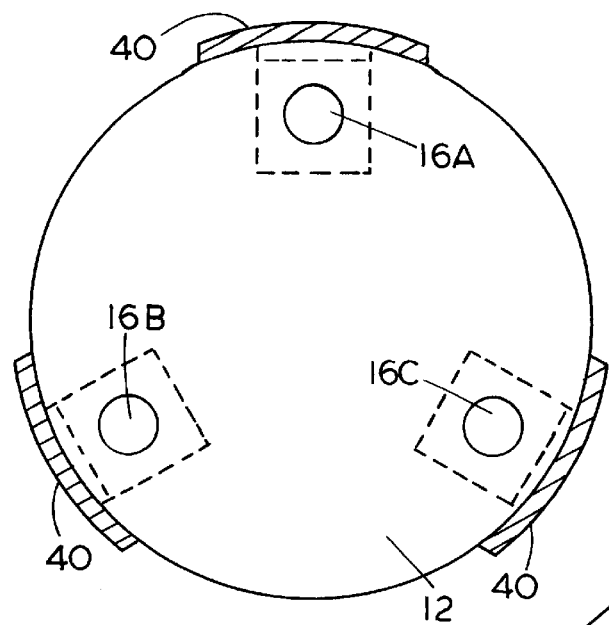
FIG. 3 is a sectional view taken substantially on line 3—3 in FIG. 2.
Figure 5:
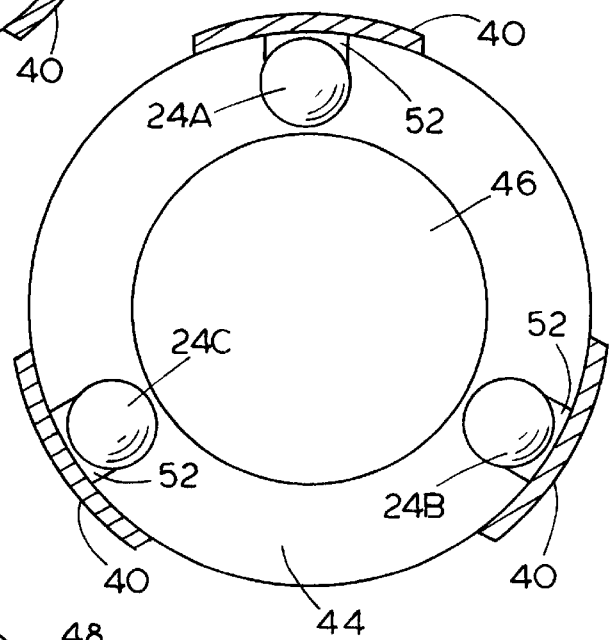
FIG. 5 is a sectional view taken as on line 5—5 in FIG. 2.
Figure 4:
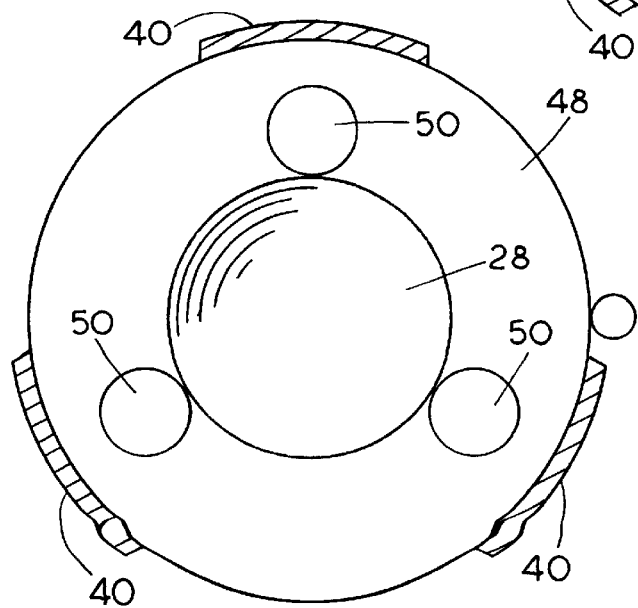
FIG. 4 is a sectional view taken as on line 4—4 in FIG. 2.

In FIG. 2, a schematic representation of a typical mounting frame is illustrated. The system 10 has a base plate 12 as previously explained, and can have either rod like supports holding it in place, forming an open network, or a wall or wall segments indicated at 40 that is used for support the base plate 12 relative to a frame wall 42. The wall 40 in turn supports a plate shown at 44 at its outer end, and this plate supports the three part spherical expander mirrors 24A, 24B and 24C on mounts such as angled blocks 52. These mounting blocks can be adjustable, to change the angle of the supported mirror to cause reflected beams to strike desired locations on the focusing mirror 28.

The plate 44 has a center bore or opening shown at 46 which is of sufficient size to provide the needed unobstructed space for transmission of the refocused beams 30A, 30B and 30C.

The spherical concave focusing mirror 28 is supported on an intermediate wall 48, that has apertures shown at 50 for passing the source beams 22A, 22B and 22C, and also the reflected beams from the part spherical expander mirrors 24A, 24B and 24C back to the ports 19A–16C in the base 12. This construction is merely a schematic representation of one way of supporting the necessary mirrors or focusing elements for the three-axis, non-scanning air data sensing system. The beams again have separate focal regions 32A, 32B and 32C. The part spherical convex expander mirrors 24A, 24B and 24C are inclined relative to the plane of the support 44, as shown, on mounting blocks or supports 52. The part spherical concave focusing mirror 28 has its central axis lying along a central axis between the three beams that are projected from the laser sources.

The instrumentation package 14 is illustrated schematically in FIG. 7, which shows the backside of the base or beam of FIG. 2. 45° mirrors 20A, 20B and 20C are provided on the backside of each of the ports 16A, 16B and 16C of FIG. 1. In FIG. 2, mirrors 20A, 20B and 20C are also shown schematically. In FIG. 7, the backsides of the mirrors are shown, and the mirrors block the view of the ports 16A, 16B and 16C. So the beams, both the originating laser beams and the reflected beams are perpendicular to the base plate. These mirrors are shown at 20A, 20B and 20C in FIG. 2, and are shown only schematically. In FIG. 7, the mirrors 20A, 20B and 20C are shown in alignment with the ports 16A–16C, but it is to be understood that the mirrors would be such that the source laser beams of coherent light would travel and would strike the mirrors, and then would be reflected out through the ports 16A, 16B and 16C, respectively.

A first laser source 56A provides an output source beam across mirror 20A and through the port 16A. Before it is reflected from mirror 20A, the beam from the laser source 56A is first passed through a beam splitter 58A. This is a non-polarizing, tap-off beam splitter which transmits approximately 99% of the beam from laser source 56A to a polarizing beam splitter 60A. The remaining 1% of the light energy, which is reflected along a tap off light path 66A, is used for a heterodyning reference signal with a reflected signal from laser source 56B.

The source light is linearly polarized and aligned to pass through the splitter 60A to the quarter wave plate 64A. Quarter wave plate 64A changes the linear polarization to circular and the beam is then reflected by the mirror 20A and out through the port 16A to the exterior mirror system 24A and 28 previously described. A frequency shifted, reflected beam forms a return signal when a particle enters detection cell 35. The return light signal is of the reverse circular polarization state as that originally leaving quarter wave plate 64A and travels the same path as the source beam and strikes mirror 20A. As the reflected signal is passed back through the quarter wave plate 64A, it is once again changed to linearly polarized light, but at an orthogonal direction to that of the laser. The polarizing beam splitter 60A then reflects substantially 100% of the reflected light signal, since the reflected light is orthogonal in polarization. The reflected light signal then is reflected along a path 62A to an optic combiner 68A, which combines the reflected signal originating from the source 56A, with a reference signal from laser sources 56C for heterodyning. A reference signal for combining is provided to combiner 68A from a beam splitter 58C, used with another laser source along a path 66C. The reference signal is shown reflected across a mirror 72. The reference signal is derived in the same manner as the reference signal on line 66A.

The combined or heterodyned signal from the optical combiner 68A is then passed to a detector 70A of conventional design which processes the signal for determining the relative velocity of the particle that caused the reflected signal. The circuit for providing an output signal from the detector may be conventional for each of the three beams for determining velocity in each of three axes. The detector output is provided to signal conditioning circuitry 73 and then to a computer 74 which provide the desired information.

Each of the other laser source beams are transmitted in the same manner and the instrumentation will receive the reflected signals for sensing in the same way as well. The reference signal for heterodyning at the signal combiners with the other reflected signals are provided from a different laser source.

The laser source 56B directs a beam into a non-polarizing beam splitter 58B, which taps of about 1% of the light energy along path 66B and passes most of the light energy of the beam to a polarizing beam splitter 60B. The source laser beam from laser source 56B then passes through the quarter wave plate 64B and is reflected by the mirror 20B and projected as beam 22B into the external mirror system, 24B and 28 as previously explained.

The reflected signals from beam 30B likewise are returned along the same path and will reflect from the mirror 20B back through the quarter wave plate (after the polarization shift caused by reflection on a particle) and into the polarizing beam splitter 60B. The polarizing beam splitter reflects all of the reflected signal along a path 62B into a signal combiner 68B. The combiner 68B receives a reference signal from the first laser source 56A along a path 66A as wag mentioned, and the combiner provides a heterodyned output signal to a detector 70B. The detector 70B provides the output to the signal conditioning circuit 73.

The third laser source for providing velocity information in the third axis is indicated at 56C. The third laser beam passes through a non-polarizing beam splitter 58C that taps about 1% of the light signal for forming the reference signal along line 66C provided to combiner 68A. The main part of the beam from the laser source 56C passes to a polarizing beam splitter 60C, which passes the source beam through a quarter wavelength plate 64C. The source beam is reflected by the mirror 20C to the external mirrors 24C and 28.

Any reflected light from a particle in the focus region for beam 30C is reflected back by the spherical mirrors 28 and 24C to the mirror 20C and back through the quarter wave plate 64C. The reflected beam has its polarity shifted and the polarizing beam splitter 60C reflects the reflected, frequency shifted light signal or beam to the signal combiner 68C along a path 62C. The combiner 68C combines the reflected light signal or beam from the third laser source 56C with the reference signal provided along path 66B from source 56B for heterodyning. The heterodyned signal passes to the detector 70C. The detector 70C provides a third velocity signal to signal conditioning circuit 73 and computer 74 for analysis and resolution of velocities in orthogonal axes.

Again, as stated, the three source laser diodes 56A, 56B and 56C have frequencies that are different by more than the frequency shift caused by the Doppler effect. Heterodyning is well known, and comprises an interferometric detection approach where the reference wavelength or frequency is shifted with respect to the original light wavelength for the reflected wave. This will insure that the Doppler shift can be measured unambiguously, that is, by separating the Source and reference frequencies, positive and negative Doppler shifts can be distinguished.

The relative velocity in three axes is obtained by knowing the angular relationship of the three beams 30A–30C relative to a reference axis or plane. The difference in measured velocity along each of the three beams 30A–30C can be resolved by geometry into velocity coordinates in three mutual perpendicular axes.

In order to calculate the velocity flow field and the resultant vector relative to the mutually perpendicular orthogonal axes mentioned above (x, y and z axis system), the measured velocities that are along different axes from a center to points 32A, 32B and 32C are translated by geometry to the measured velocities in the x, y and z axes. This is done routinely in determining the velocity vectors relative to an aircraft for example. A typical orientation for the x, y and z orthogonal axes would be the axes of the aircraft, for this type of a structure, with the z representing the fore and aft central looking axis or the longitudinal axis, x being an axis perpendicular to the longitudinal axis in a horizontal direction, and y being vertical, or in other words perpendicular to the longitudinal axis of the aircraft and the x axis. These axes are normally established in aircraft for purposes of orienting the various movements of the aircraft for navigation.

The orientation of these three axes of measurement, that is the axes of the light beams to points 32A, 32B and 32C are known with respect to the three orthogonal axes (x, y, z) since the mirrors are fixed or non-scanning relative to a base that may be mounted on an aircraft. The non scanning three-dimensional laser system has a support which mounts the laser diodes, and the light beams are spaced 120° apart around a central axis. The base 12 is indicated as being, typically, a base for a frame for mounting on an aircraft for sensing air data from the atmosphere surrounding the aircraft. Since the base is fixed, and the light transmission axes are fixed, the orientation of the light transmission axes relative to the aircraft x, y and z axes on which the base is known, as a normal course of design.

Figure 8:
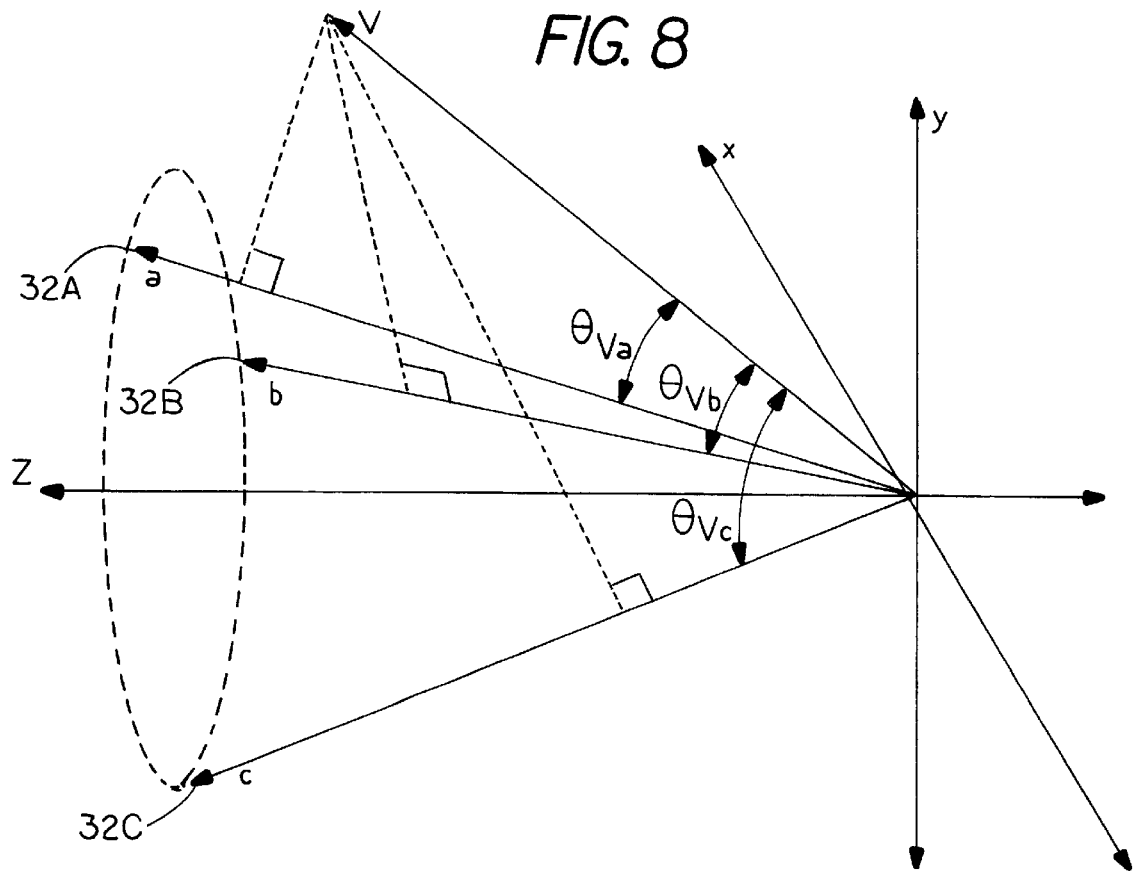
FIG. 8 is a vector diagram of the measured velocity relative to the reference axes of the system.

FIG. 8 is a vector diagram showing the velocity vector v of particles that are sensed by the laser beams. The measured velocity vectors of particles sensed at 32A, 32B and 32C and the measurement axes are represented by a, b, and c in FIG. 8.

$\theta_{Va}'$ $\theta_{Vb}'$, and $\theta_{Vc}$ are the angles between the velocity vector V and the three axes a, b, and c, respectively.

While the velocity vector V is what is to be determined, what is actually measured with the system is the portion of the velocity vector V along the three axes of observation (a, b, and c). The measurements taken can be labeled as $V_a$, $V_b$, and $V_c$ where:

$$V_a = V\cos(\theta_{Va})$$

$$V_b = V\cos(\theta_{Vb})$$

$$V_c = V\cos(\theta_{Vc})$$

If the velocity of the a, b, and c axes are translated into the orthogonal x, y, and z axes and $V_x$, $V_y$, and $V_z$, are calculated then V, which caused the measured $V_a$, $V_b$, and $V_c$ will be known.

Figure 9:
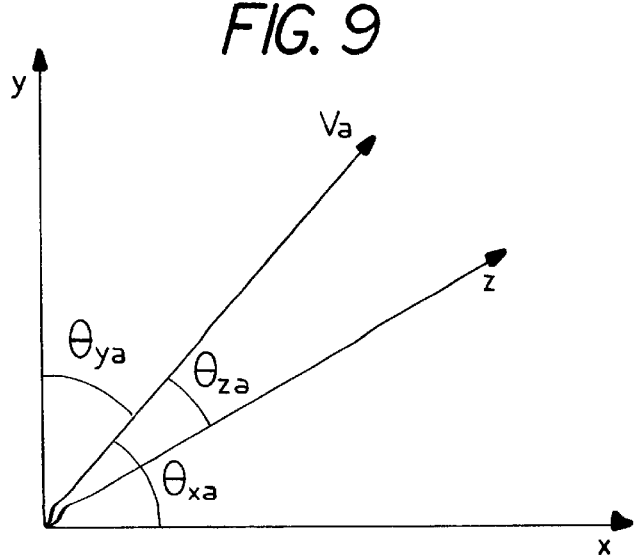
FIG. 9 is vector diagram showing the resolution of one of the measured velocities and resolving it in relation to the orthogonal axes.

$V_a$, $V_b$ and $V_c$ are determined in the circuitry disclosed and provided to computer 74 to resolve each of $V_a$, $V_b$, and $V_c$ into the velocity vectors in the x, y, and z axes ($V_x$, $V_y$, and $V_z$). Each of the measured velocities are resolved into the x, y and z vectors, and then added to the other vectors and the resultant velocity and direction of V is computed. FIG. 9 shows the relationship of $V_a$ to the x, y, and z axes. The same equations are used for $V_b$ and $V_c$. The computer 74 does the geometric calculation.

The velocity magnitudes of the particles can be represented as $V_a$, $V_b$, and $V_c$ and the angles relative to the orthogonal axes are represented in a vector diagram of FIG. 9 for $V_a$.

In the angles between $V_a$ and $V_x$, $V_y$ and $V_z$ are $\theta_{xa}$, $\theta_{ya}$ and $\theta_{za}$, respectively, as shown in FIG. 9. Likewise the angles between $V_b$ and $V_x$, $V_y$ and $V_z$ are $\theta_{xb}$, $\theta_{yb}$ and $\theta_{xb}$, respectively and the angles between $V_c$ and $V_x$, $V_y$ and $V_z$ are $\theta_{xc}$, $\theta_{yc}$ and $\theta_{zc}$, respectively. The vector diagrams are the same as FIG. 9.

A simple set of three known geometric equations with three unknowns $V_x$, $V_y$, and $V_z$ are solved by the computer 74.

$$V_x\cos\theta_{xa} + V_y\cos\theta_{ya} + V_z\cos\theta_{za} = V_a$$

$$V_x\cos\theta_{xb} + V_y\cos\theta_{yb} + V_z\cos\theta_{zb} = V_b$$

$$V_x\cos\theta_{xc} + V_y\cos\theta_{yc} + V_z\cos\theta_{zc} = V_c$$

By solving this set of equations for $V_x$, $V_y$, and $V_z$, we know the three-dimensional flow field, and the final step is to establish V by resolving the now calculated vectors in the orthogonal axes.

Other forms of the sensor system and laser sources can be utilized. For example, there could be outputs from the backside of the laser diodes that may permit eliminating the non-polarizing beam splitters.

The signals from the detectors can be converted to electrical signals and digitized in the signal conditioning circuit 73 using known techniques.

Each of the individual laser beams that is projected and which reflects light from particles will give information about particle movement or velocity relative to the base, which may be an aircraft, in separate axes. In this way, forward air speed or velocity, vertical velocity and lateral velocity can be measured. This permits determining the angle of attack and angle of side slip, as well as forward air speed. Since the system can be quite small and light, it will find adaptability to aircraft.

Light sources for the present invention can be gas lagers, solid state lasers, or other types of coherent or collimated light, either pulsed or continuous wave (CW). A collimated beam allows range measurement without focusing. The focusing can be changed as desired.

The well known LIDAR techniques can be used with the expanding mirrors reflected back to a focusing mirror. The LIDAR light sources (and related instrumentation) would be supported on the support 12.

Although the present invention has been described with reference to preferred embodiments, workers skilled in the art will recognize that changes may be made in form and detail without departing from the spirit and scope of the invention.

What is claimed is:

1. A method of measuring relative velocity of a base with respect to a fluid containing particles comprising the steps of:

providing a plurality of fixed non-scanning separate beams of light along separate non parallel axes that are fixed relative to each other and the base;

focusing the non-scanning beams of light with optical elements fixed relative to the base at locations forming separate volumes of space, each volume of space comprising particle detection regions, said particle detection regions being exposed to fluid containing particles, whereby when a particle passes through one or more of the particle detection regions light is reflected along the axis of the beam forming the respective particle detection region at a shifted frequency due to the relative velocity of the particle;

determining the difference in velocity of particles in each of the separate axes with respect to the base; and resolving the difference in velocity in the three axes into velocity coordinates in three mutual perpendicular axes.

2. The method of claim 1 including combining a reference beam formed from a beam other than the beam forming the one particle detection region beam with the light reflected from the one particle detection region to form a combined light signal.

3. The method of claim 2, wherein the step of determining includes processing the combined light signal to determine the Doppler shift of the light reflected from the one particle detection region.

4. The method of claim 1 including the step of reflecting each separate beam from an expanding mirror to form a separate expanding beam, reflecting the separate expanding beams from a focusing mirror along known different non parallel axes to form separate focused coherent light regions forming the particle detection regions.

5. The method of claim 1 including the step of providing at least three sources of coherent light separated around a central axis and each source providing a beam having an axis forming an angle with respect to a reference plane perpendicular to the central axis different from angles of the axes of beams from other sources relative to the reference plane.

6. The method of claim 1, wherein the source of light comprises a source of coherent light.

7. The method of claim 1 wherein the source of light comprises a source of collimated light.

8. The method of claim 1 wherein the source of light comprises a laser light source.

9. The method of claim 1 wherein the source of light is a tightly focused beam from a laser diode.

10. An apparatus for sensing a relative velocity between a reference support and a fluid containing particles comprising:

at least two sources of light fixed on the support forming separate non-scanning beams of light that simultaneously provide the separate beams of light;

separate expanding mirrors fixed relative to the support, each receiving a light beam from a different one of said sources of light and reflecting the light while expanding the light beam to form separate expanded light beams, which have axes fixed relative to the support;

a focusing element fixed relative to the support receiving the expanded light beams and focusing each expanded light beam at a separate focused region of light in the fluid that remains substantially fixed in space relative to the support, said focused region of each light beam comprising a detection cell, the light beams extending from the focusing element along diverging fixed axes;

said focusing elements and expanding mirrors transmitting reflected light beams from the respective detection cell back toward the respective source; and a circuit for determining the relative velocity of particles causing reflected light in each of the detection cell and for resolving the relative velocities into mutually perpendicular velocity coordinates.

11. The apparatus of claim 10 and a separate beam splitter for receiving light from each source and diverting a portion of the light to provide a reference light portion, and a light combiner combining each reference light portion with a reflected light beam associated with a different source of light.

12. The apparatus of claim 11 and a detector for detecting a frequency shift of the reflected beam relative to the associated reference light portion.

13. The apparatus of claim 10, wherein said sources of light comprise three separate sources arranged substantially 120° apart around a central axis.

14. The apparatus of claim 10 wherein said sources of light comprise laser light sources.

15. The apparatus of claim 14 wherein the laser light sources are selected to be one of the group consisting of pulsed and continuous wave lasers.

16. The apparatus of claim 10 wherein said sources of light comprise collimated light sources.

17. The apparatus of claim 10 wherein the light sources comprise LIDAR sources.

18. An apparatus of claim 10, wherein there are three light sources, each providing light along a single axis to a separate expanding mirror, each expanding mirror reflecting light along a fixed axis to the focusing element.

19. An apparatus for sensing a relative velocity between a reference support and a fluid containing particles, comprising:

a plurality of sources of light fixed on the support forming separate non-scanning beams of light directed along fixed axes;

a separate expanding mirror for each of the beams of light, each expanding mirror receiving such beam of light and reflecting and expanding the beam of non-scanning light to form separate expanded beams of light having non-parallel central non-scanning fixed axes; and a focusing element receiving the expanded beams of light and focusing each expanded beam of light at a separate focus region of light in the fluid, said focus region of each beam of light comprising a detection cell, the beams of light extending from the focusing element along fixed diverging axes, whereby each detection cell in the fluid remains at a fixed location relative to the support; and particles passing through the detection cells reflect light back to the support along the same axes as the respective beams of light.

20. The apparatus of claim 19, wherein one of the sources of light is selected from the group consisting of laser light sources, collimated light sources, and LIDAR sources.

* * * * *

UNITED STATES PATENT AND TRADEMARK OFFICE
CERTIFICATE OF CORRECTION

PATENT NO. : 6,297,878 B1
DATED : October 2, 2001
INVENTOR(S) : Mark S. Miller

It is certified that error appears in the above-identified patent and that said Letters Patent is hereby corrected as shown below:

Column 7,
Line 36, cancel "v" and insert -- V --.

Column 8,
Line 7, cancel "$\theta_{xb}$," and insert -- $\theta_{zb}$, --.

Column 8,
Line 17, cancel the equation "$V_x\cos\theta_{xb} + V_y\cos\theta_{yb} + V_2\cos\theta_{zb} = V_b$" and insert the following equation:-- $V_x\cos\theta_{xb} + V_y\cos\theta_{yb} + V_z\cos\theta_{zb} = V_b$ --

Signed and Sealed this

Twelfth Day of March, 2002

*Attest:*

*Attesting Officer*

JAMES E. ROGAN
*Director of the United States Patent and Trademark Office*